Feb. 3, 1970 M. D. VAN PEURSEM 3,493,055
CULTIVATOR SHANK STRUCTURE
Filed April 25, 1966
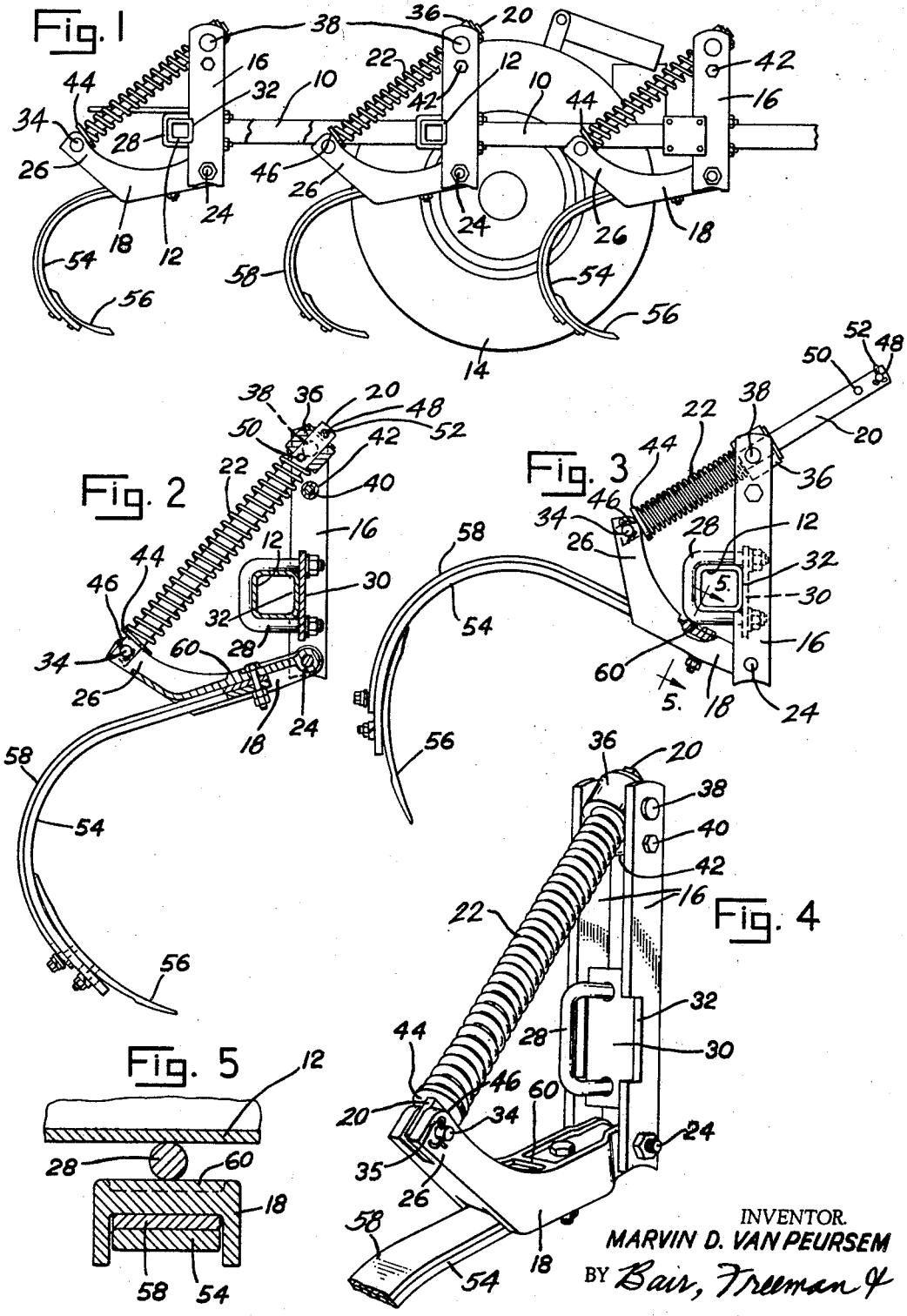
INVENTOR.
MARVIN D. VAN PEURSEM
BY Bair, Freeman &
Molinare ATTORNEYS

United States Patent Office 3,493,055
Patented Feb. 3, 1970

3,493,055
CULTIVATOR SHANK STRUCTURE
Marvin D. Van Peursem, Newton, Iowa, assignor, by mesne assignments, to Kewanee Machinery & Conveyor Company, Kewanee, Ill., a corporation of Illinois
Filed Apr. 25, 1966, Ser. No. 544,886
Int. Cl. A01b 35/24, 15/02, 65/06
U.S. Cl. 172—708        2 Claims

ABSTRACT OF THE DISCLOSURE

Improved pivoting means for a bar and pressure spring thereon with respect to a tiller point leaf spring holder of a cultivator shank structure. The leaf spring holder has a pair of surfaces rounded substantially on a radius from the pivot center, and a washer surrounds the bar and is interposed between the pressure spring and the rounded surfaces to slide thereon about the pivot center during pivoting of the leaf spring holder as the cultivator is operated.

---

This invention relates to a cultivator shank structure of the type having tiller point carrying leaf springs secured to a spring holder which is pivoted to the frame of the cultivator and is biased to a downward position by a pressure spring.

One object of the invention is to provide a novel pivotal connection between the spring holder and the pressure spring comprising a pair of rounded surfaces, the radius of which is substantially from the pivot center, and a washer between the pressure spring and the surfaces adapted to slide on the surfaces during pivotal action to result in a long-lasting pivotal connection which operates efficiently.

Another object is to provide a bar through the pressure spring which is flat in character so that it can fit between the arms of a bifurcated portion of the spring holder and is inexpensive to produce requiring only the cutting of stock bar material to length and the punching of certain holes therein, the upper end of the bar sliding through a slot of a fitting which is pivoted to the upper end of a shank support, the lower end of which pivotally supports the spring holder, the shank support itself serving as a connection for the entire assembly to the frame of the cultivator.

Still a further object is to provide stop means for the spring holder in the form of a portion thereof engageable with a U-bolt which mounts the shank support on the cultivator frame.

With these and other objects in view, my invention consists in the construction, arrangement and combination of the various parts of my invention, whereby the objects above contemplated are attained, as hereinafter more fully set forth, pointed out in my claims and illustrated in detail on the accompanying drawing, wherein:

FIG. 1 is a side elevation of a cultivator showing my improved cultivator shank structures mounted thereon;

FIG. 2 is an enlargement of a portion of FIG. 1 and shows a shank support and a spring holder in vertical cross-section, the parts being the maximum down position the same as in FIG. 1;

FIG. 3 is a side elevation similar to FIG. 2 showing the structure in the maximum up (stopped) position;

FIG. 4 is a perspective view of my cultivator shank structure, and

FIG. 5 is a sectional view on the line 5—5 of FIG. 3.

On the accompanying drawing, I have used the reference numeral 10 to indicate the longitudinal frame members of a cultivator and 12 the lateral frame members thereof. The frame 10, 12 is illustrated as of the type which is supported by depth wheels 14 in the usual manner.

My cultivator shank structure comprises a shank support 16, a spring holder 18, a bar 20 and a pressure spring 22. The spring holder 18 is pivoted at 24 to the shank holder 16 and has an upturned rear end 26. The shank holder 16 is secured to the lateral frame member 12 as by U-bolts 28 which pass through a cross web 30 of the shank holder, the holder itself being in the form of a pair of vertically arranged flat bars as shown in FIG. 4 and the cross web 30 welded to them. The bars 16 are notched as shown at 32 to seat against the frame members 12.

The lower end of the bar 20 is pivoted as at 34 to the upturned rear end 26 of the spring holder 18, and the end 26 is bifurcated as shown in FIGS. 2 and 4 so that the lower end of the bar 20 is located between the arms of the bifurcation.

The upper end of the bar 20 is slidable through a guide means in the form of an apertured fitting 36 which is provided with pintles 38 for pivoting the fitting relative to the shank support 16. A bolt 40 and a spacer sleeve 42 are provided adjacent the fitting 36 to afford proper coaction of the upper end of the fitting 36 and its pintles 38 with the upper end of the shank support 16.

The spring 22 is interposed between an abutment surface surrounding the aperture of the fitting 36 and the washer 44 which bears against rounded surfaces 46 of the arms of the bifurcated portion 26 of the spring holder 18, the radius of such surfaces being substantially on a center from the pivot 34 for an important purpose which will hereinafter appear. The upper end of the pressure bar 20 is provided with a pair of perforations 48 and 50 as shown in FIG. 3 to selectively receive a cotter pin 52 which serves as a stop as will hereinafter appear.

The spring support 18 is adapted to support a tiller point carrying leaf spring 54 to which a cultivator blade 56 is secured. A helper spring 58 may be provided, the springs 54 and 58 being bolted to the spring holder 18 and to the cultivator blade 56 in an obvious manner.

In order to provide a positive stop in the upper position of FIG. 3 the casting of which the spring holder 18 is formed is provided with a stop rib 60 so positioned as to engage the U-bolt as shown in FIGS. 3 and 5.

My cultivator shank structure has been particularly designed for deep and uniform working of the soil in the preparation of seed beds, in stubble mulching, in fallowing, in killing weeds and in renovating hay land. The action of the spring pressure 22 may be seen by comparing FIG. 3 with FIG. 2. The cultivator may be worked in trashy and rocky ground without clogging as any encounter with trash or rocks permits the clearing action illustrated in FIG. 3 by rearward and upward swing of the cultivator blade 56 as permitted by the spring action in the leaf springs 54 and 58 plus the compression of the pressure spring 22. The pressure bar in cooperation with the pressure spring insures penetration of hard ground and the construction can take severe shock loads without undue stresses.

In operation, the pivoting action of the spring holder 18 about the pivot 24 results in a rocking action of the washer 44 around the rounded surfaces 46 of the upturned rear end 26 of the spring holder 18 which I have found to be a type of connection which resists wear and is accordingly long-lasting. The rolling action just referred to minimizes pivot pin wear by reason of the rounded double ears rolling with respect to the washer 44 which acts as a thrust between the pressure spring and the spring holder 18 to eliminate costly repairs. The result is also a stronger vibrating action for the finest in field performance since each shank works independently of the others.

Some changes may be made in the construction and arrangement of the parts of my cultivator shank structure without departing from the real spirit and purpose of my invention.

I claim as my invention:

1. In a cultivator shank having a generally upright shank support adapted to be secured to a cultivator frame; a leaf spring holder adapted to hold a tiller-point-carrying leaf spring, said leaf spring holder being pivoted at one end to the lower end of the upright shank support and extending rearwardly from the pivotal connection and having a second end, said leaf spring holder having a downward position wherein its tiller-point-carrying leaf spring is adapted to be deeply embedded in the soil, a bar pivoted at one end by a pivot pin to said second end of said leaf spring holder and extending therefrom and slidable through guide means at the upper end of the shank support, which guide means provides a spring abutment surface; the improvement comprising a pressure spring bearing by its one end against said spring abutment surface, said spring by its opposite end exerting its force against said second end of the leaf spring holder, said second end of the leaf spring holder adjacent said opposite end of the pressure spring having a surface rounded substantially on a radius whose center is the center of the pivot pin, and said leaf spring holder also having an abutment surface adjoining said rounded surface, said latter abutment surface being generally perpendicular to the axis of the pressure spring when the leaf spring holder is in its downward position, and a bearing member disposed between said opposite end of the spring and said second end of the leaf spring holder, said bearing member bearing against said latter abutment surface when the leaf spring holder is in said downward position, and said bearing member sliding along said rounded surface as said spring is compressed, resulting from reactions transmitted to said leaf spring holder.

2. The improvement of claim 1 wherein the bearing member is a washer encircling said bar.

References Cited

UNITED STATES PATENTS

| | | | |
|---|---|---|---|
| 2,701,511 | 2/1955 | Graham | 172—669 |
| 3,258,076 | 6/1966 | Groenke | 172—710 |

ROBERT E. PULFREY, Primary Examiner

RONALD C. HARRINGTON, Assistant Examiner

U.S. Cl. X.R.

172—710